D. B. JORDAN.
MODE OF OILING JOURNALS.
No. 23,251. Patented Mar. 15, 1859.
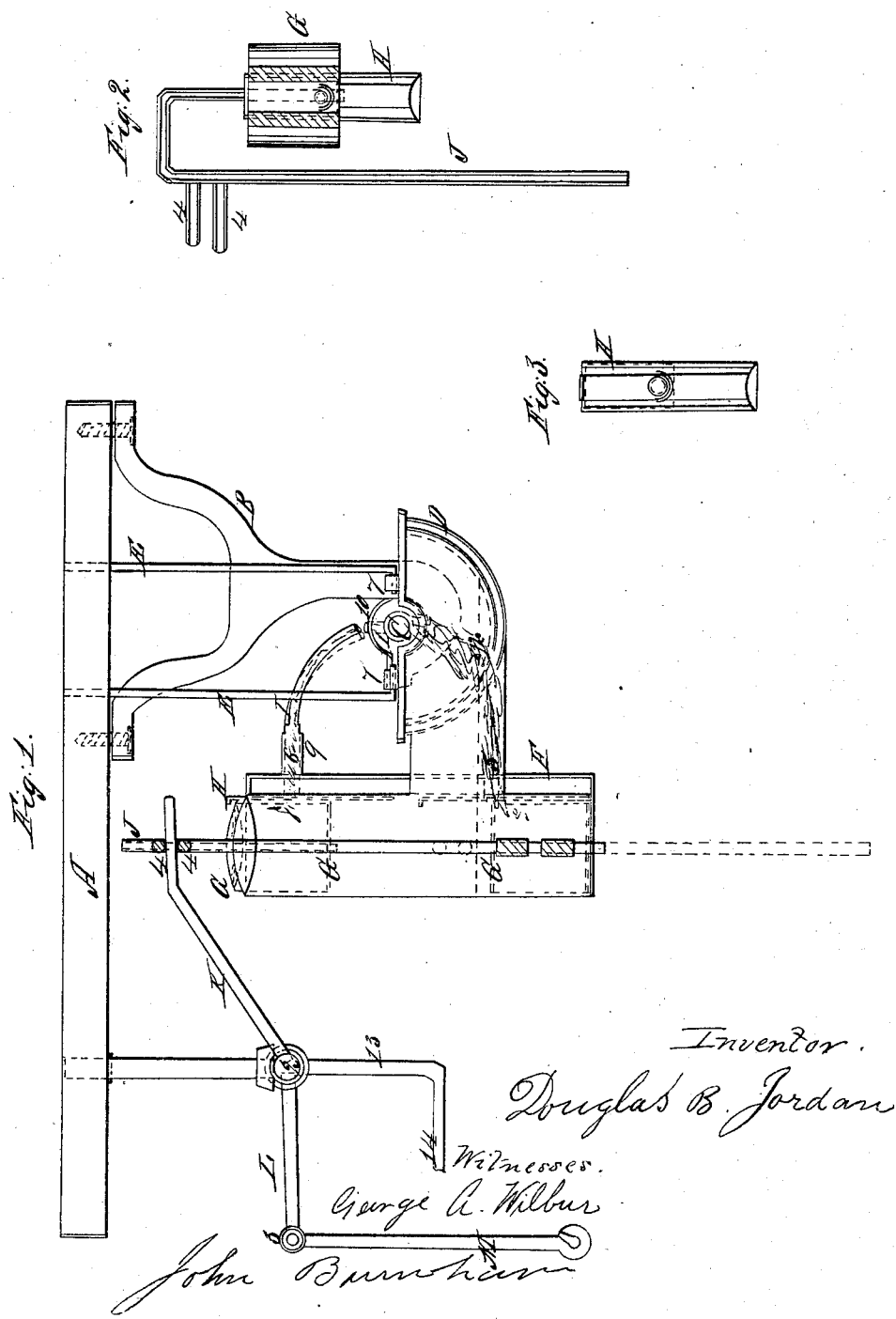
Inventor.
Douglas B. Jordan
Witnesses.
George A. Wilbur
John Burnham

UNITED STATES PATENT OFFICE.

DOUGLAS B. JORDAN, OF WOONSOCKET, RHODE ISLAND.

MODE OF OILING JOURNALS.

Specification of Letters Patent No. 23,251, dated March 15, 1859.

*To all whom it may concern:*

Be it known that I, Douglas B. Jordan, of Woonsocket, in the county of Providence and State of Rhode Island, have invented a new and useful Combination of Mechanism for Oiling or Lubricating Journals or Bearings of Shafting; and I do hereby declare that the following is a full, clear, and exact description of the construction and operation of the same, reference being had to the annexed drawings, making a part of this specification, in which—

Figure 1. is a front view of the said mechanism. Fig. 2. a detached view of the dish G, valve H, rod J, and pins marked 4, 4, brought around to the left, say one quarter of a revolution, when compared with their location as shown in Fig. 1. Fig. 3. shows a detached front view of the sliding valve when compared with the same as shown at H, in Fig. 2.—A piece of leather or suitable material is shown by red dotted outlines, in Figs. 2. and 3, as being inserted back of this valve, marked H, and has a hole or aperture in it, as shown more clearly in Fig. 3.

A, represents the girder supporting the hanger B, and shaft C.

D, is the dripper joined to the tube F; this dripper D, tube F, and other mechanism, is supported from the girder A, by means of the wires, E, E, connecting with, or into, the ears 7, 7, of the said dripper.

G represents a dish attached to the rod or lever J.

H, is a sliding valve, properly fitted to the inside of the wings or projections from the outside of the dish G. The dish G, has a hole or outlet at 8, and when raised by means of lowering the rod M, the sliding valve H, is also raised with it, until a lip from the said valve comes in contact with the main spout 6; this spout arrests the movement of the valve H. As the dish G, is further raised, it brings the hole 8, in the dish G, on a line with the hole or aperture in the leather above described, and the hole or outlet in the valve H. In this way the oil is forced into the main spout, 6, and the branch spouts I, and hence by its gravity, falls on the shaft C, through the aperture or hole in the cap or box marked 10.

J, represents the rod supporting the dish G, pins, 4, 4, and valve H.

K, represents an arm of a lever whose center is seen at 2 which being raised or lowered by pulling or lifting the arm L, (by means of the rod M,) serves to raise or lower the rod J, and dish G. This rod J, carries two pins, 4, 4, between which the end of the arm K, is made to act or operate so as to raise or lower the said lever J and dish G, with the sliding valve H.

1, represents a support coming down from the girder A, for the purpose of sustaining the shaft 2. To this shaft the arms K, and L, are attached as shown. The rod M is jointed to the arm L at 3. The shaft 2, is parallel with the shaft C. Where more than one row or line of shafting is used, this shaft, 2, requires to be multiplied. That is, any required number of stationary shafts, 2, are to be used. An arm, 13, is extended downward, from shaft, 2, and is shown broken off at 14. This arm connects with similar devices as are shown in Fig. 1, so as to operate another rod J, and dish G, at the left, and so on for any number of rows of shafting.

The tube F, is filled to the desired point with oil or other lubricating substance. The dish G, in the drawings, is shown as being raised to its highest point, and at this time, has brought up a supply of oil, which is forced or discharged through the hole 8, in this dish G, and from thence through the hole in the valve H, into the main spout, 6, when it falls by its gravity through the branch spouts I, into the holes 10, through the box, 11, on to the shaft, or shafts C. As the dish and rod are brought down, the sliding valve H, and leather described, go with them until the lower end of this valve H, comes in contact with the bottom of the tube F. As the dish G, is further lowered or immersed in the oil, it shuts over the hole or aperture, 5, in the tube F, and is filled again, when it is ready to be raised or forced up to discharge this oil into the spout, 6, and thence deliver the oil into the branch-spouts I, from which it falls, by its gravity, onto the shaft C, through the hole, 10, of the box or cap, 11.

The oversupply of oil falls from the shaft or shafts C, into the dripper D. This oil flows back again through the holes, 12, and aperture, 5, into the dish G, so as to be used over and over again until its lubricating properties are entirely consumed. The dish G, is shown, in Fig. 1, as being brought down to the bottom of the tube F, for the purpose of being filled with oil again, and also shows at this time the oversupply of oil passing through the holes, 12, and aperture, 5, into the dish G, and tube F.

I do not claim the invention of the hanger B, or the dripper D, or the girder A.

What I claim as my invention, and desire to secure by Letters Patent is—

The combination and arrangement of the shafts C and 2, the dish G, the sliding valve H and the spout marked 6 constructed and operating substantially as and for the purpose described.

DOUGLAS B. JORDAN.

Witnesses:
   ELIAS M. JENCKES,
   CHRISTOPHER ROBINSON.